Oct. 15, 1963  W. A. PLUMMER  3,106,941
METHOD OF FABRICATING ARTICLES FROM PLASTIC
AND THE ARTICLE FORMED THEREBY
Filed Dec. 1, 1958
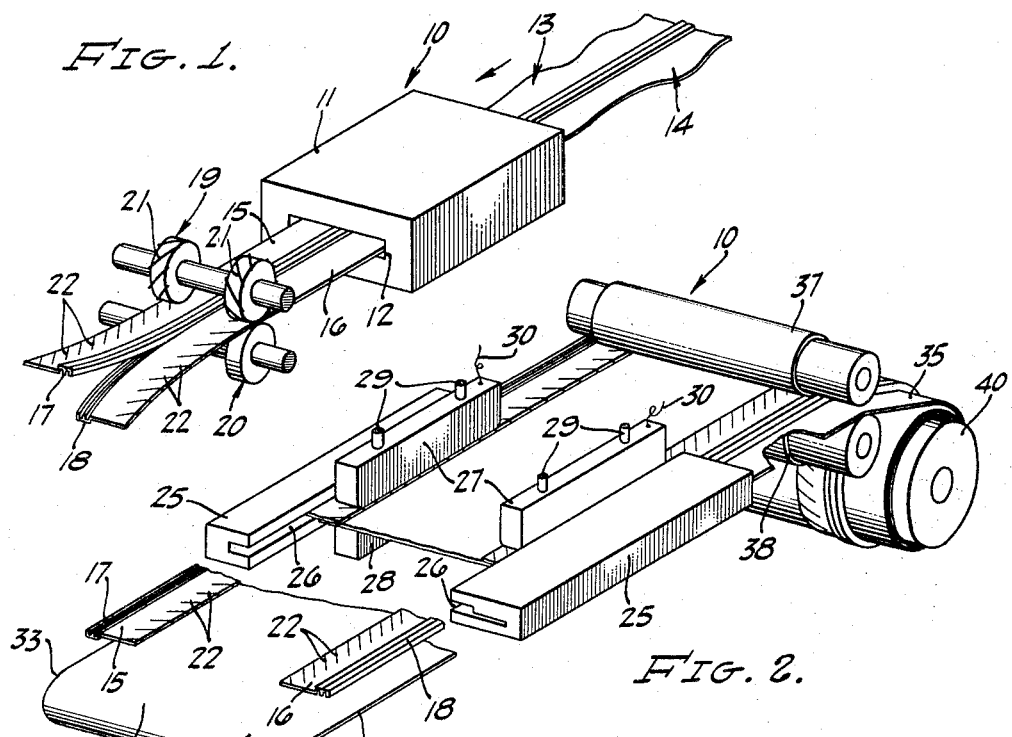
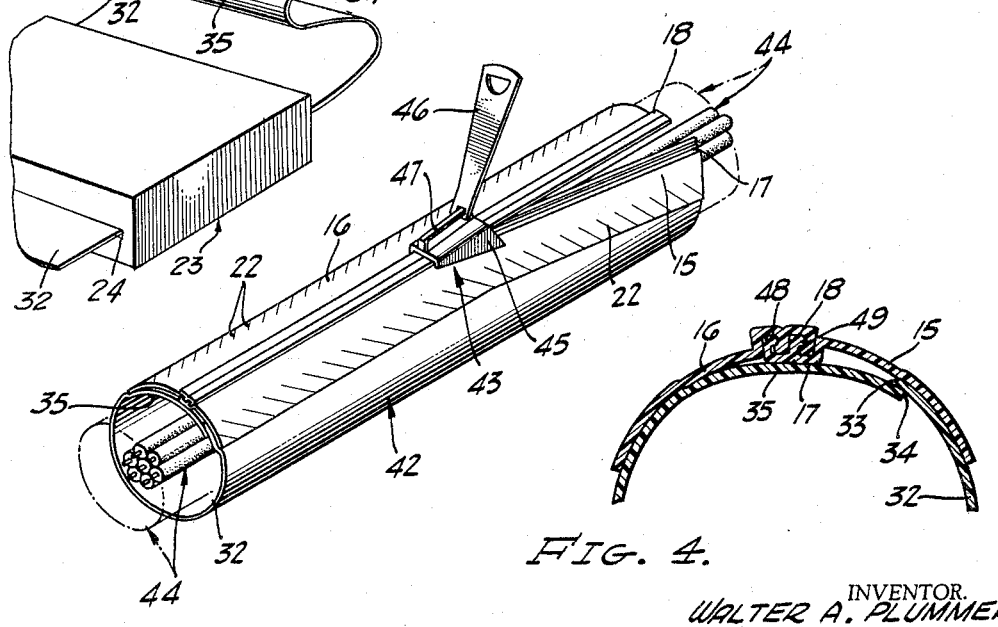
INVENTOR.
WALTER A. PLUMMER
BY
ATTORNEY

United States Patent Office 3,106,941
Patented Oct. 15, 1963

3,106,941
METHOD OF FABRICATING ARTICLES FROM PLASTIC AND THE ARTICLE FORMED THEREBY
Walter A. Plummer, North Hollywood, Calif. (3546 Crown Ridge Drive, Sherman Oaks, Calif.)
Filed Dec. 1, 1958, Ser. No. 777,817
22 Claims. (Cl. 138—128)

This invention relates to thin-walled plastic articles and methods of fabricating the same and more particularly to an improved technique for heat sealing separate components of thin flexible plastic together and to the product formed thereby.

This application is a continuation-in-part of an application for United States Letters Patent, Serial No. 687,339, filed by Walter A. Plummer on October 1, 1957, for Plastic Tubing Product and Method of Making Same, now abandoned.

It will be understood that the principles of the invention are generally applicable to the fabrication of numerous articles and products including as constituent elements thin layers of supple, flexible plastic difficult to handle and control while being fused together by prior heat sealing techniques. The problems presented are generally illustrated by those experienced in fabricating such an article as seamed plastic tubing now widely used to enclose duct systems, cabling, wire trunks having branch-outs and many other similar applications. Such tubing typically comprises a thin plastic main body of either laminated or single-ply material provided along its opposite lateral edge areas with plastic slide fastener tape heat sealed thereto, these tapes being provided with interfitting joint elements cooperating to form a longitudinal seam which may be quickly opened or closed for various purposes. Such plastic tubing as heretofore made has not been entirely satisfactory owing to difficulties encountered in providing a strong and uniform heat seal between the thin flexible tape elements and the equally thin, supple and distortable main body strip which tends to become displaced from the desired position of the parts for the heat sealing assembly thereof. The reasons for these assembly difficulties vary. For example, the plastic slide fastener tape elements commonly used in these assembly operations are customarily formed by the extrusion process and seldom are obtainable in straight flat form. Instead these elements are replete with undulations, curls, waves and other distortions rendering the same difficult to handle and to maintain in a desired aligned relation with the element to which they are to be fused. Even where means are provided for holding the tape elements rigidly aligned during heat sealing, upon release of the holding pressure the tapes tend to return to the previous curled and distorted state. This result not only provides a product which is unsightly and non-uniform in appearance but leads to the malfunctioning of the seam and the premature failure of the seam during use. The warped and undulating appearance of the slide fastener elements is transmitted to the adjacent body portion to which the elements are attached rendering the tubing or other product unmerchantable as a first quality product. If the product being made is plastic tubing, the desired gas and liquid-tight seam is found to be defective and unreliable for its intended purposes owing to the opportunity for the admission of moisture, liquids and gaseous fluids as well as the premature and unpredictable opening of the tubing during handling and otherwise. Various expedients employed heretofore to correct the foregoing and other difficulties have met with indifferent success.

It has been discovered that undulations, curling and distortions characteristic of seams formed in plastic materials are due in many instances to the non-uniform localized extrusion and elongation of the material at the seam incident to the formation of the seam by heat and slight pressure. Thus, the heating of the material along the seam softens this material with the result that the application of welding pressure to integrate the two heated surfaces causes minor thinning and elongation of the softened plastic. This lengthening of the material occurs primarily lengthwise of the seam. Material immediately to either side of the seam is heated only slightly and is not lengthened.

It follows that the fuse seaming of plastic material inherently introduces internal stresses and tendencies of the material to curl and warp. If the two components being welded together are identical or substantially so, the distorted condition is restricted to the fused area of the seam and is not noticeable except upon close inspection. Where, however, the materials being fused together have materially different shore hardness characteristics, there is a substantial differential elongation of the two components along the seam and the adjacent area. In consequence, there is produced a very decided distortion of the material, the degree of which is largely dependent on the difference in shore hardness of the components.

The described problem is particularly acute in the assembly of slide fastener tapes to the opposite edge areas of plastic stripping as, for example, in the manufacture of longitudinally-seamed plastic tubing. To provide effective holding power, interlocking slide fastener tapes of the type used for this purpose should have a shore hardness ranging between 85 and 95, whereas the plastic stripping commonly used to form the body of the tubing should be pliant and supple with a shore hardness ranging between 60 to 80. This discrepancy in shore hardness of the two principal components results in the disproportionate elongation and associated distortion of the main body strip relative to the much harder slide fastener tapes fused thereto. Accordingly, comparatively straight and flat components entering the assembly operation as made by prior heat sealing techniques produce a commercially unsatisfactory product disfigured by curled and undulating edges.

It is the purpose of the present invention to provide products made from plastic components and a method of holding the same assembled by heat-sealed junctions obviating the foregoing and other disadvantages. When the components to be assembled are the aforementioned plastic slide fastener tapes and a long, thin-walled strip of plastic material forming the body of flexible tubing, greatly improved and eminently satisfactory results are achieved by use of the following technique. The distorted and undulating strips of slide fastener taping is pretreated prior to assembly to the plastic main body of the tubing in a manner substantially relieving internal stresses within the webs of the tapes followed by slitting the tape from the edge of its attaching web to isolate stress areas from one another longitudinally of the tape. The tape is then placed under slight tension as it is advanced through a sealing station where the portion thereof to be fused to another component is pressed into pressure contact with the component along the line of assembly while being heated to an appropriate heat sealing temperature simultaneously with the preprocessing of the slide fastener tapes. The main body strip to which the tapes are to be sealed is pretreated by subjecting the same to sharp chilling while being held flat and straight with the result that this body strip becomes stiff and retains a desired assembly shape for the short period required to effect its assembly to the slide fastener tapes. The degree of chilling is of considerable importance and best results are obtained when the softer and more supple main body strip is cooled to stiffen the strip temporarily to exhibit a shore hardness comparable to that of the slide fastener tapes at the moment the seam therebetween is formed. To this end the body strip is slightly over cooled to compensate for any temperature rise occurring between the cooling chamber and the heat sealing station normally removed some distance away. A convenient method for so treating the body strip is to pass the strip through a chilling chamber immediately before advancing the stiffened strip to the heat sealing station. In consequence, it is found that the strip not only retains its desired shape and facilitates the handling and feeding of the strip with its lateral edges held uniformly in a desired assembly position with an accuracy not heretofore approached but, additionally, distortion due to unequal flow of the seam areas fusion are entirely avoided. Furthermore, it is found that the prechilling of the main body provides a stronger and more uniform heat seal, and there is less tendency for the plastic material immediately adjacent the weld to be thinned objectionably during the sealing process.

A feature of the improved tubing product provided by the assembly technique constituting the present invention is the provision of a guard flap integral with the main body of the tubing and positioned to underlie completely the slide fastener tapes when interlocked to form a seam. This guard flap prevents objects enclosed within the tubing from entering between the slide fastener tapes during the closing operation or from thereafter entering the joint and forcing the tapes apart. The flap also guards against the accidental entrance of seam sealing solvent onto the contents of the tubing as, for example, onto the insulation of wiring.

Other features of the invention include provision for holding webs of the slide fastener tapes flat, straight and accurately positioned in superimposed relation along laterally spaced portions of the main body strip with only the slit edges of the tape webs exposed for engagement by the sealing and heating electrodes. Means provided for holding the tape in this manner form an important component of the automatic equipment employed in sealing the tapes to the tubing body.

Accordingly, it is a primary object of the present invention to provide an improved technique for heat sealing plastic components together to provide an article of manufacture.

Another object of the invention is the provision of a new assembly technique for securing together components having plastic surfaces suitable for joining by heat sealing techniques and featuring preliminary processing operations for the components by which the components can be more easily held in a desired assembly position for heat sealing.

Another object of the invention is the provision of an improved method of assembling thin narrow strips of plastic material to thin, flexible and supple plastic sheeting to provide an end product substantially free of distortion and undulations adjacent the heat-sealed areas.

Another object of the invention is the provision of a technique for heat sealing together plastic components of differing sensitivities to heat sealing temperatures and pressures and providing simple easily applied procedures compensating for these sensitivity characteristics.

Another object of the invention is the provision of a technique for joining together plastic members of differing shore hardness by subjecting one or both parts to such temperatures as to bring the shore hardness characteristics of the parts into substantial harmony to minimize differential flow of the parts in the seam area while being fused together.

Another object of the invention is the provision of a method for treating extruded plastic stripping in a manner relieving internal stresses and converting distorted, wavy and undulating stripping to substantially straight and uncurled stripping.

Another object of the invention is to provide an improved flexible tubing product formed essentially of thin-walled, flexible plastic material and having an interlocking longitudinal seam adapted to be opened and closed repeatedly as well as to be sealed closed, the product so provided being adapted to be manufactured and coiled in a flat condition with the seam open for later assembly about piping or wiring at the point of use.

Another object of the invention is the provision of a continuous method for producing a flexible plastic product from thin-walled plastic components.

Still another object of the invention is the provision of an improved method for processing extruded plastic slide fastener tape to relieve stresses therein and for converting the wavy, distorted and irregularly shaped web portions thereof into straight flat lengths substantially free of internal stresses.

These and other more specific objects will appear upon reading the following specification and claims and upon considering in connection therewith the attached drawing to which they relate.

Referring now to the drawing in which a preferred embodiment of the invention is illustrated:

FIGURE 1 is a schematic view in perspective of a preferred mode of straightening deformed plastic slide fastener tapes;

FIGURE 2 is a schematic view in perspective of the principal components employed in the assembly of continuous plastic tubing and of suitable mechanical aids useful in pretreating and in effecting the assembly of the components thereof;

FIGURE 3 is a view in perspective of the tubing during its assembly about a bundle of wires; and FIGURE 4 is an enlarged fragmentary view in transverse section through the slide fastener seam after assembly and showing the position of the guard flap thereacross.

Referring to the drawings and more particularly to FIGURES 1 and 2, there is shown the principal equipment components employed to fabricate plastic tubing according to one method of practicing the present invention, this equipment being designated generally 10. The equipment includes an elongated oven 11 having an open-ended tunnel 12 for the passage therethrough of at least one pair of plastic slide fastener tapes 13 and 14. The oven is provided interiorly thereof with any suitable heating elements controlled in any conventional manner to heat the plastic tapes almost to the point where the plastic material starts to flow or stretch, it being understood that the particular operating temperature will vary in accordance with the speed at which the tapes are passed through the oven. The tape to be processed may be supported by suitable guide rollers or by a conveyor. It will be noted that the unprocessed tape entering the oven from the right has very irregular wavy webs characteristic of presently available commercial plastic tape. Tapes 13 and 14 are here shown as assembled to one another on entering oven 11 as this is found of convenience in the handling of the tapes, although it is not essential to the process.

As the tapes leave the exit end of tunnel 12, they are quite hot and soft and, for this reason, the webs stretch readily to the slight extent found desirable and necessary to relieve stresses in the tapes and enabling the tapes to lie in a straight, flat condition. Such straightening is aided materially by the slight tension required to feed the tape through the oven. To provide further assurance against subsequent warping and curling of the tape webs as they cool, the wide flat webs 15 and 16 are subjected to a further and important slitting step as the webs pass between pairs of slitter rolls 19 and 20. At least one roll of each pair is provided with diagonal knives 21 which act to slit the webs 15 and 16 along lines 22 preferably lying at an angle to the edges of the webs. Slits 22 will be recognized as isolating adjacent portions of the web from one another as respect the transmission of internal stresses within the tape webs without, however, materially affecting the strength of the webs. This is particularly true after all portions of the tape webs have been fused to the plastic main body of the tubing as will be explained presently. Although not so shown, it will be understood that suitable drive means is connected to rollers 19 and 20 and they may be employed to advance the tape being treated through the oven and past the slitters.

After the tape has been treated as described, it is cooled and the two halves are separated from one another preparatory to their fusion to the opposite lateral sides of the tubing body web. Although tapes 13 and 14 are not here illustrated as feeding directly into the tubing assembly equipment, it will be understood that it is a matter of choice whether the tapes are processed simultaneously with the assembly of processed portions thereof to the tubing body or whether the stress-relieving operation is performed separately from the assembly operation. Either mode of operation is feasible. It will, of course, be recognized that the straightened and stress-relieved tapes can be twisted or otherwise properly oriented as may be desirable for assembly to the tubing body.

Referring now to FIGURE 2, the equipment preferably employed in the assembly of plastic tubing will be understood to comprise a suitable prechilling chamber designated generally 23 having narrow slots 24 across its opposite ends through which the main body strip of thin plastic material 32 is fed while being advanced to the heat sealing station. Chilling chamber 23 may be provided with rollers, flat opposed shoes, flat springs and the like located against the opposite faces of plastic strip 32 and cooperating to hold the strip flat and straight while being chilled and stiffened. Any suitable chilling means may be used for cooling strip 32 to the extent found effective in stiffening the strip to the extent required to bring the shore hardness thereof temporarily into harmony and equality with the shore hardness of webs 15 and 16 of tapes 13 and 14 when in welding position between the welding electrodes 27, 28. Since at normal room temperature the shore hardness of the slide fastener tapes is desirably within the range of 85 to 95 to provide the interlocking tongues and grooves thereof with adequate holding power, it is preferable to precool only stripping 32 and not the tape webs. Slight excess cooling of strip 32 is desirable to compensate for heat gain while advancing the strip to the heat sealing station, the object being to present the parts to be fused together at the sealing station with substantially uniform shore hardness characteristics during the brief interval required for this operation so that substantially uniform thinning of the seam areas occurs in both components.

In some cases owing to the particular characteristics of the different plastic materials being joined, equal lengthening of the components lengthwise of the seam may require the differential precooling of both components, or the heating of one and the cooling of the other, and/or the provision of temporary non-equivalent shore hardness characteristics in the parts being joined. It is, therefore, to be understood that a flat and undistorted seam between plastic materials of differing characteristics can be achieved according to this invention by the proper differential temperature conditioning of the components immediately prior to the junction thereof by heat sealing.

The stiffened strip 32 is advanced directly from chilling chamber 23 into grooves 26 provided in the edges of a pair of parallel tape guide members 25, 25 formed of electrically non-conductive material. It is pointed out that grooves 26 are of a size suitable for receiving and positioning the relatively thick tongue and groove sections 17 and 18 of the tapes while leaving the web portions 15 and 16 fully exposed and extended toward one another in the same plane. Guide strips 25 are suitably supported for adjustment toward or away from one another to accommodate the assembly equipment to the processing of tubing of different widths.

Fusion of the tape webs to pre-cooled and stiffened strip 32 is preferably accomplished by the aid of two pairs of heating and pressing electrodes 27, 28. The upper pair 27 of these electrodes is carried by vertically reciprocal supporting rods 29 by which these electrodes can be raised or lowered relative to the stationary lower pair of electrodes 28, 28. Metal electrodes 27 and 28 have smooth flat opposed surfaces and are connected in circuit as by wires 30, 30 with a high frequency generator. This assures that heating takes place primarily in the area between the electrodes with the electrodes proper remaining relatively cool.

Strip 32 of the width desired for the body of the tubing is fed lengthwise of electrodes 28 with one edge 33 lying between the inner end of slits 22 and the tongue and groove portion 17 of tape 15. The other lateral edge 34 of the tape preferably extends well beyond the outer lateral edge of the tongue and groove portion 18 of tape 16 so as to form a sealing flap 35 for the finished tubing, this flap lying flat in the deep bottom portion of groove 26 in the adjacent guide member 25 during the assembly operation.

The assembled tubing product is advanced intermittently as by rubber-covered feed rollers 37, 38 rotating in opposite directions, the individual increments of advance being limited to the length of electrodes 27, 28 and being carried out while the electrodes are held separated and de-energized. Following this advance, the electrodes are lowered to press the tape webs to the underlying portions of the still cold and stiff strip 32. The high frequency generator is then energized heating the contacting areas of the plastic elements to a fusion heat at which time the current flow is discontinued, preferably automatically, as the electrodes remain gently pressed together until the parts are firmly fused together, the time interval for the pressing operation being approximately one-half that required for heating. The described heat sealing operations are preferably performed in accurately-timed relationship synchronized with the intermittent advance of the strip and of the tapes, an operation which may be accomplished either manually or automatically, the latter being preferred inasmuch as it does not require attention by the operator or manual operations of any kind. However, for special runs or for reasons of economy, the tapes can be hand-fed beneath the electrodes and any one or more of the other operations can also be performed by manual manipulations.

It is found that minor lengthwise adjustments of the tape webs 15 and 16 required for purposes of stress compensation and the correction of curling, twisting and the like, is facilitated by slits 22. This corrective action is further facilitated if the slits are made at an angle to the web surfaces, though such inclination is not essential to the slight over-riding of the slit edges taking place as a part of the corrective action during the assembly and heat sealing operation.

Finished tubing discharging from feeding rolls 37 and 38 may be wound flat on a shipping spool 40 for compact packaging. Spools 40 may be provided with side flanges protecting the exposed edges of the tubing from injury during subsequent handling and shipping.

The finished tubing product designated generally 42 is provided with a suitable slide device 43 and is shown in FIGURE 3 in the process of being assembled about a group of electric wires 44, only a small number of the wires being shown. It will be understood that tubing 42 can be made of any desired width to enclose snugly a bundle of wires 44 of any size. Slide device 43 comprises a slider proper 45 having a pull member 46 slidable along a retaining web 47 in accordance with conventional practice. It will be recognized that the slide member is formed to fit over the tongue and groove sections 17, 18 of the slide fastener tapes and is suitably shaped interiorly thereof to guide these members into and out of interlocking engagement depending upon the direction in which the slide device is pulled lengthwise of the tube.

FIGURE 4 is an enlarged view showing a particularly suitable form of interlocking tongue and groove design for the slide fastener tapes. Note that each tape is provided with a pair of longitudinal grooves 48 shaped to receive and closely interfit with the complentarily shaped tongues 49 of the other tape. It will be recognized that the particular shape of the slide fastener elements may be of any other suitable form although one is preferred in which the engaging elements mutually cooperate to provide a fluid and moisture proof seal when nested together.

Desirably, flap 35 completely bridges the slide fastener tapes and overlaps slightly with the opposite lateral edge 33 of the plastic body 32 of the tube. Accordingly, this flap underlies the closure slide device 43 and therefore cooperates in providing a complete enclosure for the wires independently of the slide fastener tapes and aids not only in the expeditious closure of the tapes but in preventing stray wires from flexing outwardly into the path of slide device 43 as it is being closed. The flap also prevents dirt and foreign matter from entering the grooves of the slide fastener during the closing operation, a happenstance leading to the malfunctioning and the improper closure of the tubing. Other important functions of the guard flap are to prevent injury to wiring as the slide device 43 is operated to close the seam and to frictionally hold the seam together when tubing filled with wire is flexed sharply thereby causing the wires to press the flap firmly against the interior walls of the tubing. Additionally, the guard flap safeguards against the entry of the liquid sealing solvent often used in sealing the seam closed. The entry of such solvent could damage plastic insulation covering wires enclosed by the tubing.

The plastic elements may be made from any suitable plastic material of which there are a great variety. Polyethylene and the various vinyls are particularly suitable but are merely mentioned by way of illustrative examples. It is mentioned further that the plastic covering herein described is suitable for many other applications than as a wire harness or enclosure for electrical wiring. For example, the tubing may be used as a covering for piping of all kinds either as a protective and appearance covering or as a means for holding other elements assembled to the pipe such as heat insulation to steam pipes.

Although the fabricating technique provided by the present invention has been described in connection with the production of a specific product of a novel character, it is pointed out that the principles of the invention are applicable generally to the fabrication of numerous plastic articles of manufacture including those wherein it is desirable to form heat fused seals while one or more of the components being joined are retained in a simple or a compound curved position by the pre-cooling thereof while held in the desired curvature. Likewise, the assembly of film-like plastic sheeting is greatly facilitated by pre-cooling the sheeting to stiffen the same before forming heat-fused seams.

While the particular method of fabricating articles from plastic and the article formed thereby herein shown and disclosed in detail are fully capable of attaining the objects and providing the advantages hereinabove stated, it is to be understood that they are merely illustrative of the presently preferred embodiments of the invention and that no limitations are intended to the details of construction or design herein shown other than as defined in the appended claims.

I claim:

1. That method of fabricating continuous longitudinally-seamed plastic tubing adapted for shipment flat and disassembled for subsequent assembly into fluid-tight flexible tubing at the place of use, which method comprises, heating an interlocking pair of plastic slide fastener tapes to relieve internal stress, slitting the heated mounting webs of said tapes transversely of the webs to isolate stress areas therein, and fusing said webs along the opposite lateral edge areas of an elongated thin plastic tape with the interlocking portions of said tapes facing in opposite directions and positioned to interfit with one another when said thin strip is curled transversely thereof to form a tube.

2. The method defined in claim 1 wherein the slit web of one of said slide fastener tapes is sealed to said thin plastic strip along an area spaced inwardly from one lateral edge a distance sufficient to provide a closure flap adapted to underlie both slide fastener tapes in the assembled positions thereof and cooperating therewith in forming fluid-tight plastic tubing.

3. The method defined in claim 1 wherein the web of at least one of said slide fastener tapes is fused to said thin plastic strip inwardly of one lateral edge to provide a flap underlying said slide fastener tapes in the assembled position of the tubing, said flap being sufficiently wide to overlap the opposite lateral edge of the thin strip when the slide fastener strips are interlocked with one another.

4. The method defined in claim 1 characterized in pre-cooling said thin plastic while holding the same flat to stiffen the same, and thereafter passing said stiffened tape while precooled to a fusing station where said plastic slide fastener tapes are fused to the lateral edges thereof.

5. That method of fabricating a continuous length of plastic tubing which comprises supporting the tongue and groove edge portions of separate continuous plastic slide fastener tapes in spaced-apart relation and parallel to one another with the web portions of each tape extending toward one another, placing a thin continuous strip of plastic material between said tapes with the opposite lateral edges of said strip respectively in overlapping relation to an associated one of said webs, simultaneously pressing a selected length of said webs and the juxtaposed portions of each lateral edge of said strip into firm contact while heating the juxtaposed surface areas to the point of fusion, continuing to hold the plastic parts in firm contact without heating until the fused joint has taken a set, and thereafter advancing and similarly fusing together immediately adjoining consecutive lengths of non-fused portions of said strip and of said tapes.

6. The method defined in claim 5 including the step of slitting the web portions of said tapes before fusing the same to said strip, and holding said tapes flat and straight during the fusing thereof to said strip.

7. The method defined in claim 5 including the step of slitting the web portions of said tapes at spaced intervals prior to the fusion thereof to said strip, and applying sufficient tension to the tapes during the fusion thereof to said strip to hold the same straight thereby providing a quality plastic tubing product substantially free of curl, warp, undulations and the like irregularities.

8. That method defined in claim 5 characterized additionally by the step of pre-cooling said plastic strip as the same is advanced toward the place of fusion with the webs of said slide fastener tapes for the purpose of stiffening said strip and of facilitating the handling thereof during the tape fusing step.

9. An article of manufacture comprising a pair of homogeneous plastic tapes having interlocking seam-forming elements extending longitudinally along one lateral edge of each and adapted to interfit with one another, said tapes also having a wide flat web along the other lateral edge thereof having stress-relieving slits extending inwardly from said edge dividing the web into tabs the adjacent edges of which are in direct contact with one another.

10. An article of manufacture comprising a sheet of thin flexible material, elongated plastic slide fastener tapes having complementally formed interlocking edges forming a separable closure means, said tapes each having a wide web extending therealong fused to said flexible sheet material, the fused portions of said webs having stress-relieving slits extending inwardly from its outer longitudinal edge forming separate tabs, said tabs and the adjacent portions of said webs being secured to opposed edges of said sheet material in a fluid-tight manner.

11. An article of manufacture as defined in claim 10 wherein the adjacent edges of said slits are substantially parallel to one another and inclined at an angle to the longitudinal edge of said web.

12. An article of manufacture as defined in claim 10 wherein the web of one of said tapes is secured to said sheet material inwardly of an edge thereof a distance sufficient to form a flap adapted to underlie both of said slide fastener tapes when interlocked with one another.

13. An article of manufacture as defined in claim 12 wherein said sheet of material is an elongated strip having said slide fastener tapes secured along its opposite longitudinal edges and wherein said strip is of plastic material and is adapted to provide a tube when said slide fastener tapes are interlocked.

14. An article of manufacture comprising an extruded slide fastener tape having along one edge thereof a plurality of tongues and grooves of complementary shape adapted to interlock with another section of tape of the same size and shape to provide a readily separable seam, the other longitudinal edge of said tape being wide and substantially flat and formed with a plurality of similar longitudinally spaced tabs therealong the adjacent edges of which tabs are in side-by-side contact with one another.

15. That improvement in the fuse welding of thin tapes of plastic material to a lateral edge of a thin strip of supple plastic material readily flexible at normal room temperature and difficult to feed and control while being fed past a heat fusing station, said improvement comprising passing said thin strip in heat exchange with a cooling medium to pre-cool said strip while the same is held flat and until said strip becomes stiff enough to be self-supporting over lengths of several inches, and immediately advancing said pre-cooled stiffened strip to a fusing station with one lateral edge aligned with an advancing length of thin plastic tape, and fuse welding an edge of said tape to the juxtaposed surface of said strip.

16. That improvement in the manufacture of tubing having a longitudinal seam of interlocking elements mounted on supporting webbing of flexible and heat fusible plastic, said improvement comprising feeding a continuous elongated and flattened strip suitable for forming the tube body past a cooling station and there cooling said strip to stiffen the same, advancing said pre-cooled stiffened strip past a heat welding station, advancing separate strips of interlockable tapes having webbing therealong of heat fusible plastic, pressing said plastic webs against juxtaposed lateral edge portions of said stiffened strip while heating the contacting areas to heat fuse the same together, and maintaining the contacting heat areas of said webbing and of said strip under pressure until said heated plastic has taken a set.

17. That improvement in heat sealing thin walled plastic components together and holding the same oriented in desired positions relative to one another during the sealing operation, said improvement including pre-cooling at least one of the plastic components to stiffen the same and to facilitate the retention of a desired shape thereby, and immediately thereafter heat sealing said pre-cooled and stiffened component to a second component along a seam, and holding the joined components together until said seam cools and takes a set.

18. That improvement in the fuse seaming together of a first and a second plastic component having differing shore hardness characteristics to provide a finished assembly substantially free of distortion which improvement comprises, pre-cooling the softer component to increase the shore hardness thereof to a degree such that said component will tend to lengthen by the same amount as said second component during the heat sealing assembly thereof, and thereafter heat sealing said pre-cooled first component to said second component by heat and pressure applied thereto while said first component is cool.

19. That improvement in the fuse seaming together of plastic components having differing shore hardness characteristics, said improvement comprising feeding the component of greater shore hardness past a sealing station while the component is substantially at room temperature, advancing a second component of lower shore hardness past a chilling station and there chilling the component to increase the shore hardness thereof temporarily to a value equivalent to the shore hardness of said first mentioned component, and heat sealing said first and second mentioned components together while the shore hardness characteristics are substantially equivalent.

20. That improvement in the manufacture of plastic tubing having a continuous longitudinal separable seam formed by interlocking plastic components having a higher shore hardness than the main body of the tubing to which the same are joined by seam welding, said improvement comprising simultaneously advancing a wide plastic strip and a pair of plastic interlocking joint tapes past a seam welding station, pre-cooling said wide plastic strip as the same approaches said welding station to a temperature at which the shore hardness of said strip is equivalent to the shore hardness of said interlocking joint tapes, and immediately and progressively seam welding said tapes to the opposite lateral edge portions of said pre-cooled wide plastic strip.

21. That improvement defined in claim 20 characterized in that the portion of said tapes seam welded to said plastic strip is provided with transverse slits spaced lengthwise of said tapes prior to the seam welding thereof to said pre-cooled plastic strip.

22. That improvement in the manufacture of plastic tubing having a continuous longitudinal separable seam formed by interlocking plastic components having a higher shore hardness than the main body of the tubing to which the same are joined by seam welding, said improvement comprising simultaneously advancing a wide plastic strip and a pair of plastic interlocking joint tapes between opposed heating electrodes at a seam welding station, precooling said wide plastic strip as the same approaches said electrodes to a temperature at which the shore hardness of said strip is equivalent to the shore hardness of said interlocking joint tapes, immediately and progressively seam welding said tapes to the opposite lateral edge portions of said precooled wide plastic strip while held pressed gently together by said electrodes, and utilizing said precooled strip to cool the one of said electrodes in contact therewith.

References Cited in the file of this patent

UNITED STATES PATENTS 1,043,143     Raymond _____ Nov. 5, 1912

(Other references on following page)

UNITED STATES PATENTS

| | | |
|---|---|---|
| 1,710,211 | Gammeter | Apr. 23, 1929 |
| 1,831,349 | Evans | Nov. 10, 1931 |
| 1,887,741 | Trotter | Nov. 15, 1932 |
| 2,203,937 | Barley | June 11, 1940 |
| 2,252,305 | Puschner | Aug. 12, 1941 |
| 2,392,695 | Rohdin | Jan. 8, 1946 |
| 2,427,229 | Riley | Sept. 9, 1947 |
| 2,514,088 | Pinsky | July 4, 1950 |
| 2,517,570 | Irons | Aug. 8, 1950 |
| 2,551,094 | Bryce | May 1, 1951 |
| 2,674,559 | Zobel | Apr. 6, 1954 |
| 2,680,087 | Sundback | June 1, 1954 |
| 2,687,978 | Vogt | Aug. 31, 1954 |
| 2,701,222 | Hetzel | Feb. 1, 1955 |
| 2,756,172 | Kidd | July 24, 1956 |
| 2,774,699 | Clark | Dec. 18, 1956 |
| 2,794,227 | Dorman | June 4, 1957 |
| 2,797,463 | Dorman et al. | July 2, 1957 |

FOREIGN PATENTS

| | | |
|---|---|---|
| 762,226 | Great Britain | Nov. 28, 1956 |